March 6, 1956

L. D. TOTTEN 2,737,140

WELDING FRAME

Filed May 4, 1953

Luther D. Totten
INVENTOR,
BY Bernard P. Willer
ATTORNEY

March 6, 1956

L. D. TOTTEN 2,737,140

WELDING FRAME

Filed May 4, 1953

Luther D. Totten
INVENTOR,

BY Bernard P. Miller
ATTORNEY

March 6, 1956

L. D. TOTTEN
WELDING FRAME 2,737,140

Filed May 4, 1953

Luther D. Totten
INVENTOR,

BY Bernard P. Miller
ATTORNEY

United States Patent Office 2,737,140
Patented Mar. 6, 1956

2,737,140

WELDING FRAME

Luther D. Totten, Los Angeles, Calif.

Application May 4, 1953, Serial No. 352,733

7 Claims. (Cl. 113—102)

The present application is a refile on my application Serial Number 250,247 of similar title which was filed October 8, 1951, and which through inadvertence, sickness and without intention to abandon, became abandoned on January 15, 1953.

The present invention relates to apparatus for holding work while it is being welded, and more particularly to apparatus for axially aligning and anchoring the adjacent ends of two pipe sections in position to be butt-welded together.

In butt-welding the sections of "big-inch" pipe lines a considerable problem is presented in obtaining proper alignment before welding, and in maintaining such alignment during the welding operation. The operation of properly welding such large diameter metal pipe (10 inch and larger), actually presents three problems, namely, (1) getting the sections into axial alignment, (2) "re-rounding" pipe which is not truly circular, and (3) holding the adjacent section ends abutted and aligned while they are being welded together.

The principal object of the present invention is to provide an apparatus which will mechanically solve those three problems.

Under present day conventional practice, the welding operation takes place on the earth's surface at the side of the ditch into which the pipe is to later be lowered. The initial or general aligning of the two sections to be welded is accomplished by the tedious operation of blocking or "shimming-up" under their adjacent ends, and by rotating one or both sections until two opposite exterior surfaces of one section are brought into even alignment or registration with two similar surfaces of the other section. If one or both of the pipe sections are "out of round," as is usually the case, this first step in the operation may well take considerable time, several minutes at least. When this step has finally been accomplished, the abutted ends are welded together along the portions thereof which are in perfect registration. These extents can well be of only two or three inches in length each.

An outwardly expanding shoe or mandrel is placed within the bores of the two sections to span their meeting ends, and to extend some little distance in each direction from the seam. The section ends are then sledged to deform the sections so as to bring other portions of their exterior surfaces into complemental alignment or registration. Each time portions of the sections are brought into superficial alignment, those portions are welded together for the arcuate extent of such registration. This sledging and tacking procedure is continued until the entire butt-end has been accomplished. The interior expanding mandrel is then removed, and the same operation is repeated at the next joint.

It is obvious from thea bove description, that present day conventional methods are time consuming and expensive.

The apparatus of the present invention is power operated, and is designed to clamp the adjacent ends of the pipe sections together, to press them both into truly circular condition, and to hold them stationary while the complete weld seam is made. Operational time is thereby reduced by seventy-five percent, or more.

Another object of the present invention is to provide an apparatus for the purposes described, which is maneuverable along the pipe string by power driven tractor equipment.

A further object is to provide apparatus which is easy and simple to operate, and does not require any considerable amount of special training on the part of the operator.

Other objects will be apparent from the following description when taken in conjunction with the accompanying three sheets of drawings, wherein.

Like characters of reference designate like parts in those figures of the drawings in which they occur.

In the drawings.

Figure 1:
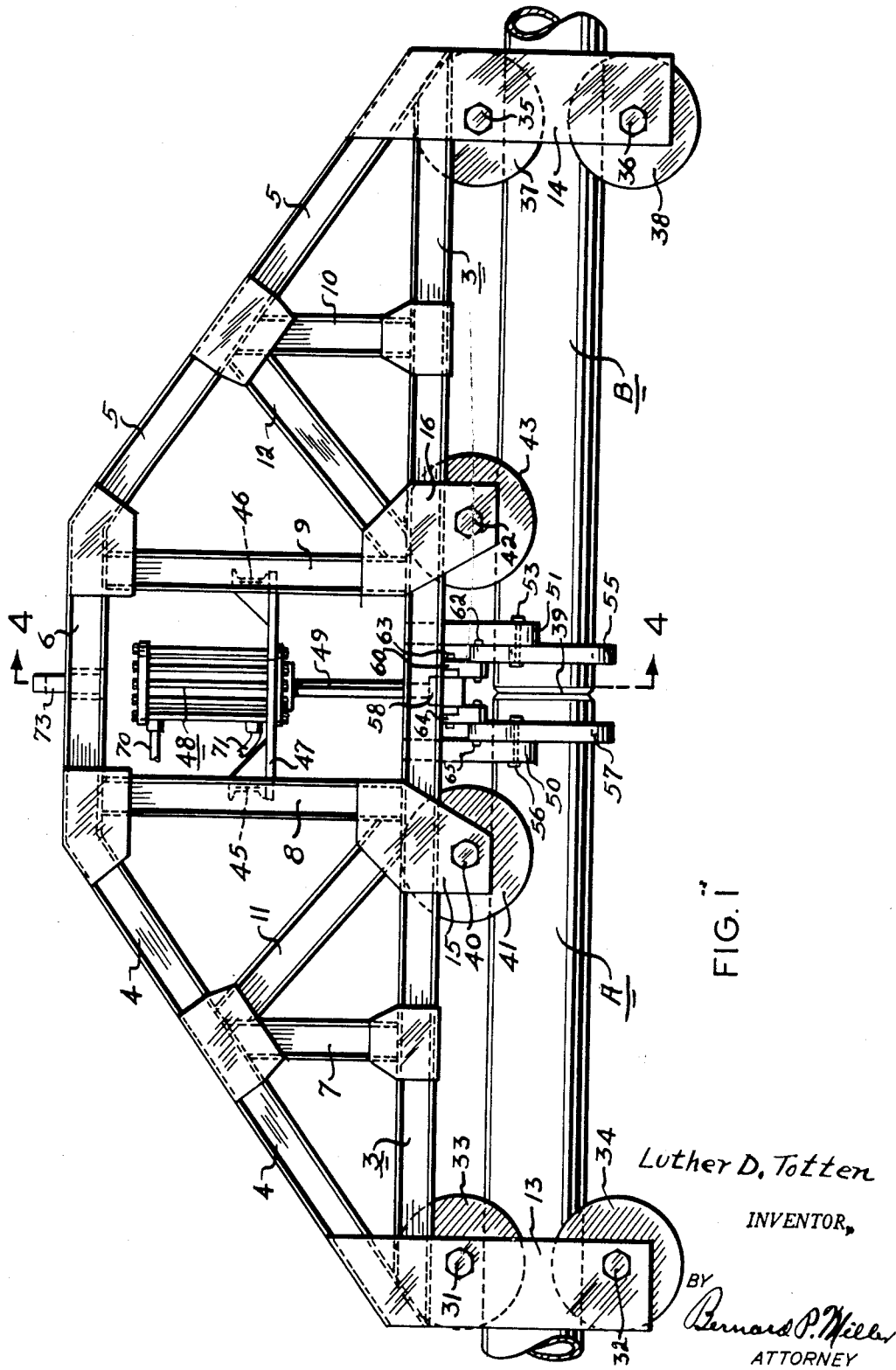
Figure 1 is a side elevational view.

Reference numerals 1 and 2 indicate two substantially identical vertical side members which are preferably fabricated out of structural steel I-beams or H-beams. The exact construction of the two side members 1 and 2 need not be specific, so long as they are rigid and are sufficiently strong to withstand the stresses which are to be placed upon them, as is more fully described hereinbelow. The frame member 1, in the form shown in the drawings, includes a horizontal longitudinal sill 3, two upwardly slanting stringers 4 and 5, and a horizontal header 6. Suitable vertical posts 7, 8, 9 and 10 are provided upon the sill 3 to support the stringers and the header, and suitable braces 11 and 12 are also provided upon the sill 3 for strengthening the entire side members. The various elements (3 through 10) are united at the various points of juncture by riveting or weld-integration. At each of its ends, the sill 3 is provided with a rigid downwardly projecting leg, and the two legs are indicated by the reference numerals 13 and 14. At each side of its longitudinal center, the beam 3 is provided with a rigid depending plate and these two legs are indicated by the reference numerals 15 and 16.

The side member 2 is preferably identical in construction as the above described side member 1, and includes a longitudinal horizontal sill 17, upwardly slanting stringers 18 and 19, a horizontal header 20, suitable vertical posts and braces, not shown, but which correspond in location and performance to the posts 7, 8, 9 and 10, and the braces 11 and 12 of the side member 1. The ends of the sill 17 are provided with rigid depending legs 21 and 22, and more centrally, with rigid depending plates 23 and 24.

The two side members 1 and 2 are held in rigid spaced parallel positions by a plurality of suitable cross-beams 25—26, 27—28, and the two headers 6 and 20 are connected by transverse horizontal beams 29 and 30.

The over-ail frame thus constructed of the two spaced side members 1 and 2, are some twelve to twenty feet in length, according to the diameter of the pipe to be accommodated by the device. These dimensions are not, of course, limited.

Figure 2:
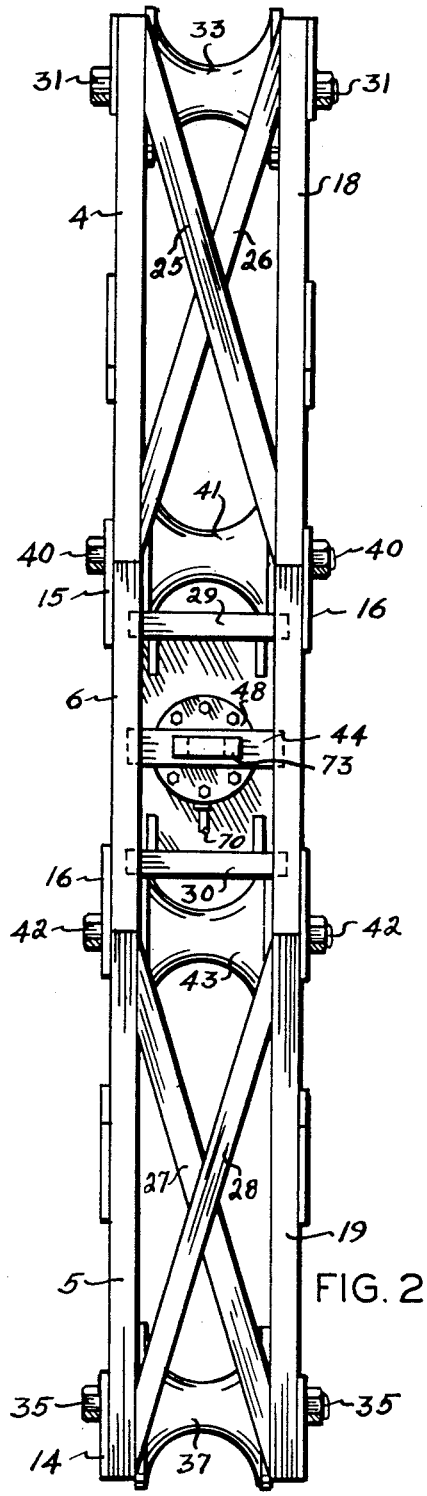
Figure 2 is a top view.

When the two side members 1 and 2 are thus assembled in parallel relation, the depending plates 13 and 14 are brought into alignment with the two similar plates 21 and 22, respectively (Fig. 2). The two plates 13 and 21 are alignedly perforated transversely to receive horizontal axles or pivot pins 31 and 32 which are vertically spaced apart. Between the plates, the upper axle 31 is provided with a grooved faced roller 33, and a similar roller 34 is provided on the lower axle 32. The radius of the grooves in the faces of the rollers 33 and 34 are substantially complemental to the superficial radius of a pipe section A, so that when the section is inserted between the rollers, it is held against both lateral and vertical movement, but is permitted longitudinal and rotative movement.

The pair of depending plates 14 and 22 at the other end of the frame sill 3 are similarly provided with two vertically spaced horizontal axles 35 and 36 with rollers 37 and 38 rotatably mounted thereon between the plates. The rollers 37 and 38 are similar in size and configuration, and are adapted to receive therebetween, a pipe section B, similar to the above mentioned section A.

The pipe sections A and B are adapted to be slid longitudinally toward each other until their adjacent ends meet even with and beneath the longitudinal center of the sill 3. The meeting line of the two pipe sections is indicated by the reference numeral 39 (Fig. 1).

The two pairs of rollers 33—34 and 37—38 are so positioned with relation to each other, that the pipe sections A and B are substantially aligned axially when disposed between their respective pair of rollers.

The transversely aligned depending legs 15 and 23 are alignedly perforated to receive a horizontal axle 40, and between the plates, the axle 40 is provided with a rotatable roller 41 which is similar to the roller 33. The roller 41 is adapted to roll upon the upper surface of the pipe section A, when the section moves longitudinally thereunder. The two depending pair of legs 16—24 are similarly provided with a horizontal axle 42 and a roller 43 thereon.

The above described mechanism constitutes a frame formed of two side members or sections and having a longitudinal opening or passage therebetween (between the plates 13—21, 14—22, and between the legs 15—23 and 16—24), for receiving two axially aligned pipe sections A and B. The six rollers act as means for substantially, but possibly imperfectly, axially aligning the pipe sections A and B with each other. The perfection with which the pipe sections are axially aligned, depends upon how truly circular the meeting ends of the two sections are formed. Obviously, if the wall of one or both of the sections A or B are not truly circular, then the peripheral surfaces of the sections cannot be made to coincide at their meeting ends. It is further obvious, that in order to obtain a smooth and unobstructed flow opening or bore from one section to the other, or in other words, at the line 39 of juncture, the meeting ends of the sections must be re-formed to make them both truly circular. The means by which the apparatus of the present invention accomplishes this "re-rounding" operation is next described hereinbelow.

The space between the two headers 6 and 20 is transversely spanned by a cross-beam 44, and therebelow, the four centrally located vertical posts are connected by a series of horizontal beams, two of which may be found in Fig. 1 in dotted lines and indicated by the reference numerals 45 and 46. A heavy horizontal metal plate 47 also spans the space between the four central posts, and is rigidly welded to the posts and to the horizontal beams extending between the posts.

A heavy duty high pressure piston-chamber or ram-cylinder 48 is rigidly mounted in vertical position on the plate 47 and is suitably anchored or braced with relation to the four central posts and their cross braces or beams. The exact manner of rigidly anchoring the cylinder 48 to the frame need not be specific, so long as it is adequately strong. The cylinder 48 houses a vertically slidable ram or piston head, not shown, which may be of conventional construction so long as it is designed to withstand and operate under high hydraulic pressures.

The lower end of this ram or piston is provided with a depending piston rod 49 which projects downwardly through the lower end of the cylinder 48. The piston rod 49 extends downwardly to a point substantially even with the two frame sills 3 and 17.

Figure 5:
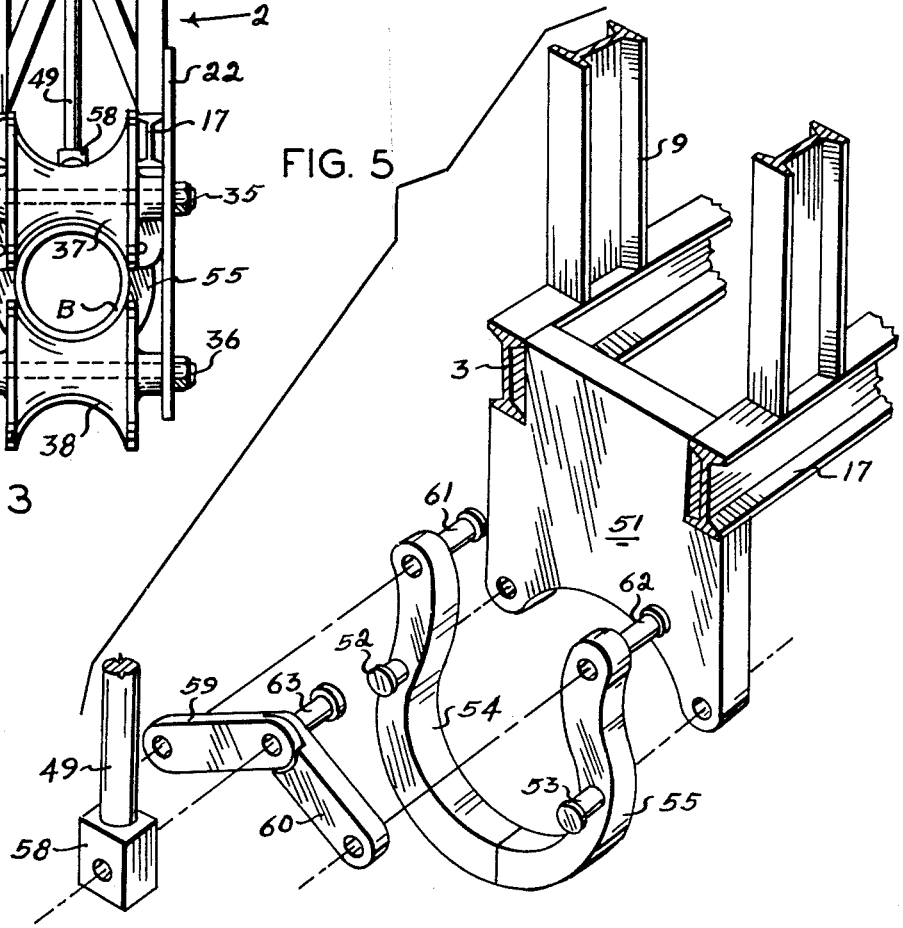

Between the horizontal sills 3 and 17, there are anchored two heavy steel plates or brackets 50 and 51 which are equidistantly spaced at each side of the lower end of the piston rod 49. These plates 50 and 51 are substantially identical, and the configuration of the plate 51 is clearly illustrated in Fig. 5 of the drawings.

Figure 4:
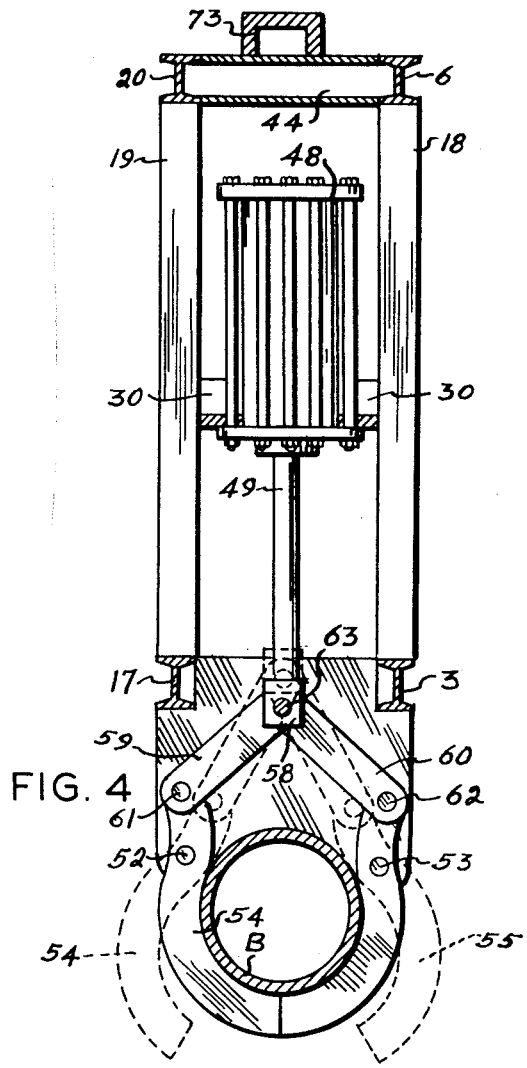
Figure 4 is a vertical sectional view taken substantially along the line 4—4 of Fig. 1; and, Figure 5 is an exploded perspective view detailing the elements of the pipe clamping unit, and their relation to each other.
Figure 3:
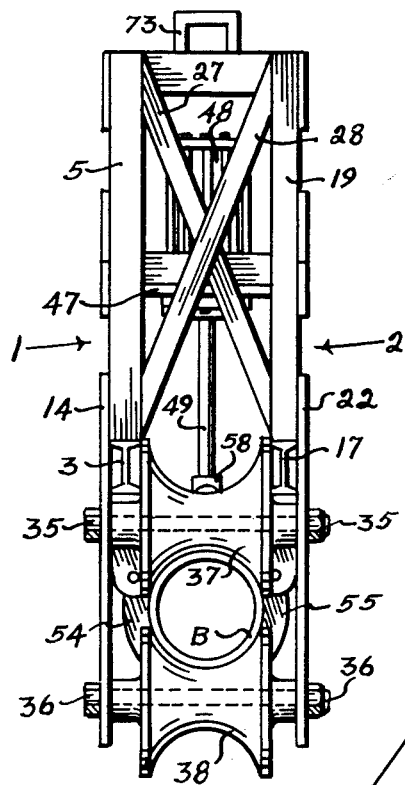
Figure 3 is an end elevation.

The lower portion of the plate 51 is through perforated in two corresponding places to receive pivot pins 52 and 53. The pin 52 rockably mounts an arcuate clamp-arm 54 intermediate its ends, and the other pivot pin 53 similarly mounts a similar clamp-arm 55. As clearly illustrated in Figs. 4 and 5 of the drawings, the lower portions of the clamp-arms 54 and 55 are arcuately bowed outwardly from each other on similar radii. These radii are complemental to the exterior surface of the pipe sections to be handled by the device.

The other depending bracket plate 50 is similarly provided with pivot pins for mounting a similar pair of arcuate clamp-arms. Fig. 1 illustrates one of such pins and one of such arms, which are respectively indicated by the reference numerals 56 and 57.

The clamp-arms each extends above its pivot pin, and the upwardly extending portion of each arm is connected to a solid head 58 on the lower end of the piston rod 49 by draw-links. The draw-links which actuate the clamp-arms 54 and 55 are clearly illustrated in Figs. 4 and 5, and are indicated by the reference numerals 59 and 60. Pivot pins 61 and 62 act respectively to connect the links 59 and 60 to the clamp-arms 54 and 55, and a pivot pin 63 acts to connect the adjacent ends of the two links to the solid head 58 on the lower end of the piston rod 49.

The other clamp-arms are similarly connected at their upper ends to the head 58 by similar draw-links. One of these links is illustrated in Fig. 1 of the drawings, and is indicated by the reference numeral 64, and a pivot pin 65 makes the connection between the link 64 and the clamp-arm 57.

The clamp arrangement is such that when the piston rod 49 is moved downwardly, the individual clamps of each of the two pairs are simultaneously moved toward each other, with one pair forcibly gripping the pipe section A, and the other pair grasping the pipe section B. The two pipe sections are therefore not only held positively in end abutted relation, but sufficient hydraulic pressure can be built up within the cylinder 48 to actually deform the pipe into a true circle. It may be found desirable to provide the interiors of the adjacent ends of the pipe sections with some conventional type of mechanically operated expander or mandrel, not shown. This is optional.

Similarly, pairs of clamps, in addition to the two pairs shown, may be similarly installed on the sills 3 and 17 to grip each section A and B of the pipe in two or more places to insure positive alignment of the pipe.

The cylinder 48 has upper and lower fluid conveying lines 70 and 71 whereby the piston or ram may be moved either upwardly or downwardly.

The entire frame may be rolled along the pipe sections A and B, when desired, with the rollers 33, 41, 43 and 37 supporting the weight of the frame. After a weld seam has been made at the line 39, the frame is merely rolled along the last installed pipe section to its unconnected end. The upper surface of the frame is preferably equipped with an eye 73, whereby it may be lifted by power crane apparatus.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In apparatus for axially aligning and force-rounding the adjacent ends of two end-abutted pipe sections, the combination of: a mobile frame of rigid construction having a longitudinal pipe receiving passage; a pair of closely related parallel rolls mounted at each end of said passage, said rolls each mounted on a pivotal axis lying transverse to said passage, each of said pairs adapted to receive a pipe section therebetween; two sets of pipe clamps mounted adjacent each other in the central portion of the frame and being co-axial with said rollers, each of said sets consisting of a plate having an arcuate pipe receiving recess and arcuate clamping jaws pivotally mounted on the plate; and power means for actuating said jaws to clamp the pipe and force-round the same.

2. Structure as specified in claim 1, in which the rollers are the sole means for supporting the frame in a mobile manner on said pipe sections.

3. In an apparatus for axially aligning and force-rounding the adjacent ends of two end-abutted pipe sections, the combination of: an elongated rigid frame; a pair of closely related parallel rollers rotatably mounted at one end of said frame, said rollers having arcuately grooved faces for receiving and complementally surrounding the major circumference of one pipe section therebetween; a pair of similar rollers similarly mounted at the other end of said frame for receiving another pipe section and holding same in axial alignment with the first mentioned pipe section, permitting their abutting ends to coincide; a transverse plate rigidly carried by said frame adjacent its center, said plate having an arcuate recess in co-axial alignment with said grooved faces of said rollers for nesting a circumferential portion of one of said pipe sections adjacent its abutted end; a pair of arcuate jaws pivotally carried by said plate for swinging together and complementally enveloping substantially all of the remaining circumferential extent of said pipe section; a similar rigid plate and similar pivoted jaws carried by said frame in relatively close spaced relation and in axial alignment with the first mentioned plate and jaws for enveloping substantially all of the circumferential extent of the other said pipe section adjacent its abutted end; a hydraulic ram carried by said frame adjacent said plates; and operative connections comprising linkage pivotally connected to said ram and said jaws, whereby the jaws of each pair of jaws may be pivoted toward each other thereby force-rounding a pipe section which may be cross-sectionally ovate.

4. Structure as specified in claim 3, in which: the rollers act to hold the pipe against any but axial movement; and in which the rollers also support the frame in a mobile manner for travel along the pipe.

5. In an apparatus for force-rounding an ovate pipe section, the combination of: a rigid frame; a pair of closely related parallel rollers rotatably mounted at one end of said frame, said rollers having arcuately grooved faces for receiving and complementally surrounding the major circumference of a pipe section therebetween; a plate rigidly carried by said frame in spaced relation from said rollers, said plate having an arcuate recess in co-axial alignment with said grooved face of said rollers for nesting a circumferential portion of said pipe section; a pair of arcuate jaws pivotally carried by said plate and arranged for swinging together for complementally enveloping substantially all of the remaining circumferential extent of said pipe section; a hydraulic ram carried by said frame adjacent said plate; and operative connections comprising linkage pivotally connected to said ram and said jaws, whereby the jaws may be pivoted toward each other thereby force-rounding a pipe section which may be cross-sectionally ovate.

6. Structure as specified in claim 5, in which: the rollers act to hold the pipe against any but axial movement.

7. In an apparatus for axially aligning and force-rounding the adjacent ends of two end-abutted pipe sections, the combination of: an elongated rigid frame; a pair of closely related parallel rollers rotatably mounted at one end of said frame, said rollers having arcuately grooved faces for receiving and complementally surrounding the major circumference of one pipe section therebetween; a pair of similar rollers similarly mounted at the other end of said frame for receiving another pipe section and holding the same in axial alignment with the first mentioned pipe section whereby their abutting ends will coincide; a plurality of clamps carried by the central portion of the frame in relatively close spaced-apart relation between, and in co-axial alignment with said pairs of rollers for gripping each pipe section in two or more places, each said clamp including a transverse plate rigidly carried by said frame and having an arcuate recess for nesting a circumferential portion of one of said pipe sections and a pair of arcuate jaws pivotally connected to the plate and arranged for swinging together for complementally enveloping substantially all of the remaining circumferential extent of said pipe section; a hydraulic ram carried by the frame adjacent said clamps; and operative connections comprising pivoting linkage between said ram and said jaws, whereby the jaws of each clamp may be pivoted toward each other thereby holding and force-rounding each pipe section which may be cross-sectionally ovate.

References Cited in the file of this patent

UNITED STATES PATENTS

| Number | Name | Date |
|---|---|---|
| 1,319,608 | Nelson | Oct. 21, 1919 |
| 2,061,671 | Riemenschneider | Nov. 24, 1936 |
| 2,235,553 | Haversack | Mar. 18, 1941 |
| 2,277,519 | Laxo | Mar. 24, 1942 |
| 2,354,794 | Buehler | Aug. 1, 1944 |
| 2,525,680 | Ingemarson | Oct. 10, 1950 |